July 4, 1933. C. LANDERS 1,916,516
BROACHING MACHINE
Original Filed Jan. 23, 1928 2 Sheets-Sheet 1
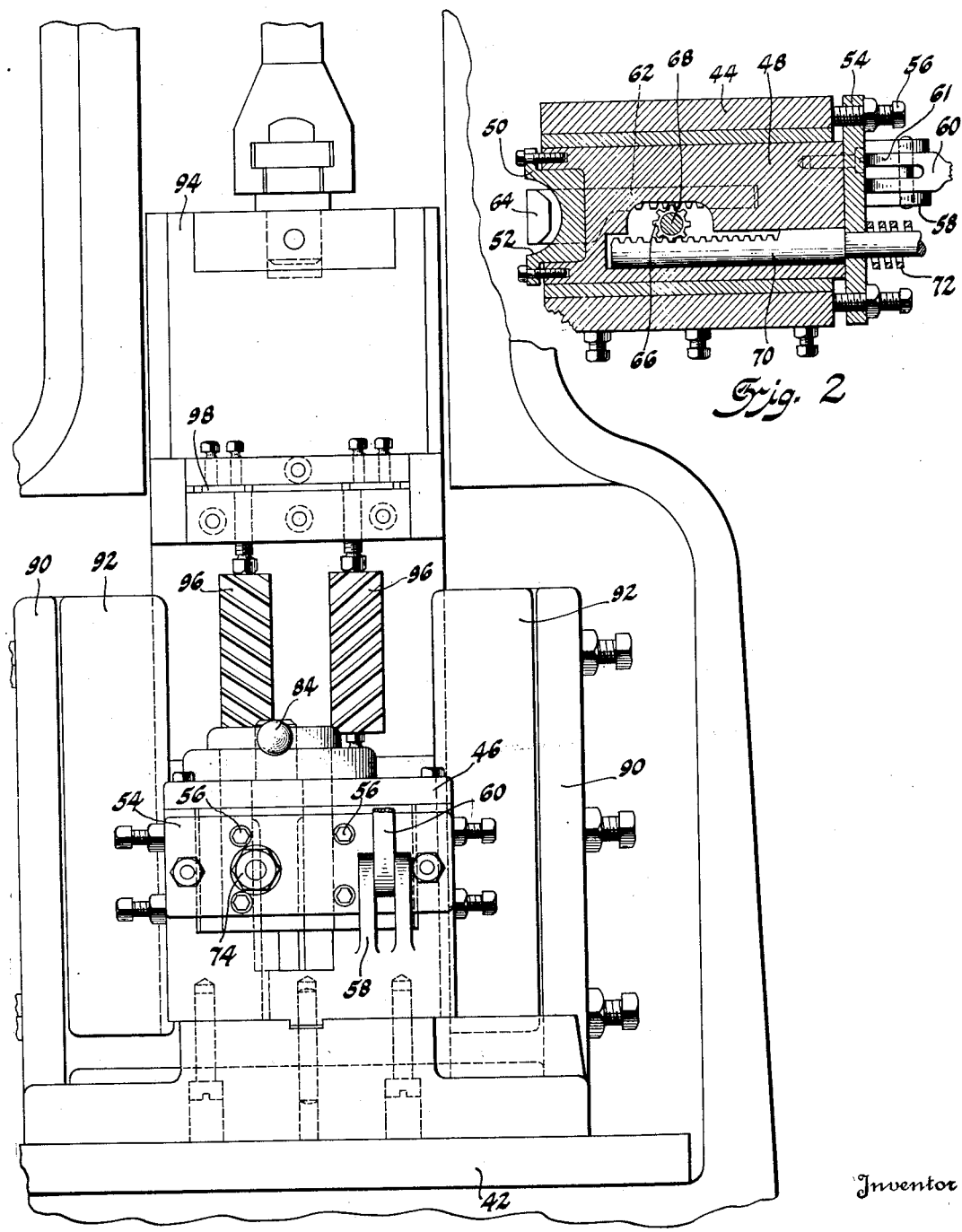
Inventor
CHARLES H. LANDERS
By Blackmore, Spencer & Fink
Attorneys July 4, 1933.  C. LANDERS  1,916,516
BROACHING MACHINE
Original Filed Jan. 23, 1928   2 Sheets-Sheet 2
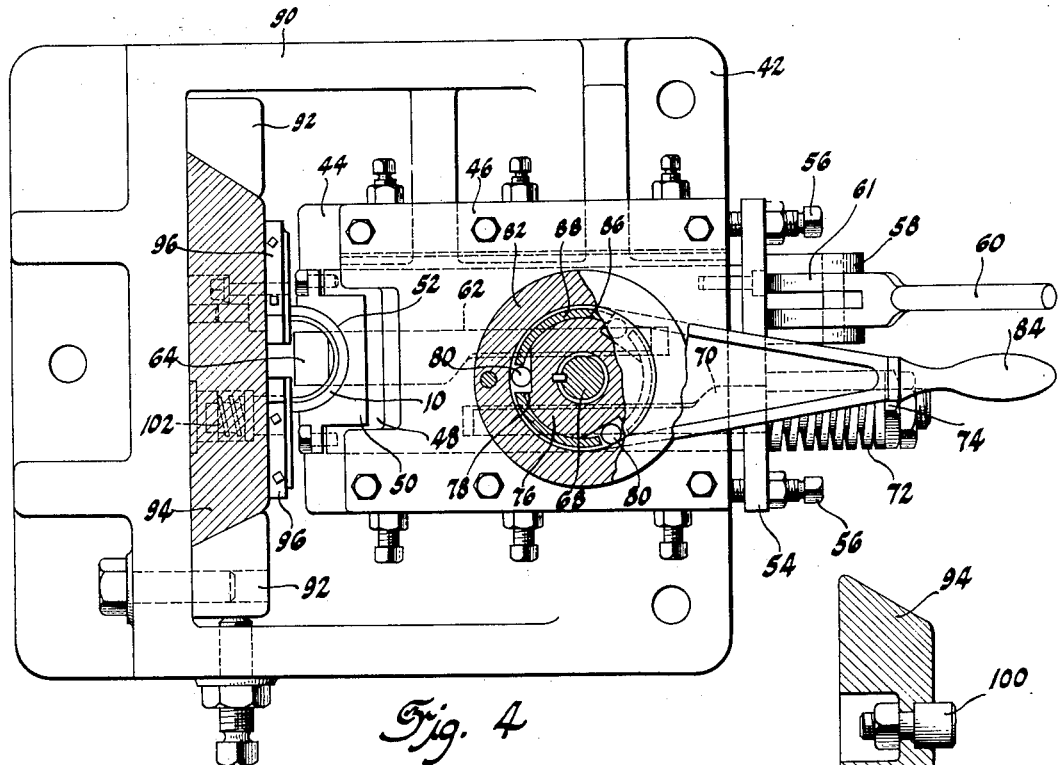
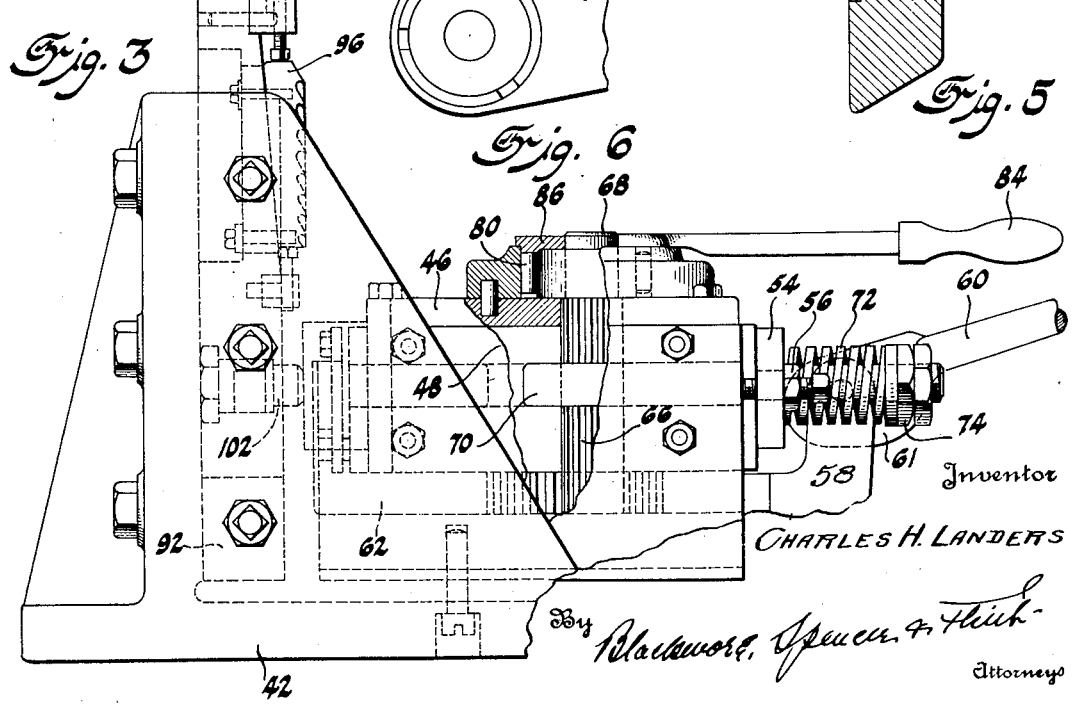
Inventor
CHARLES H. LANDERS
By Blackmore, Spencer & Flint
Attorneys Patented July 4, 1933

1,916,516

UNITED STATES PATENT OFFICE

CHARLES LANDERS, OF LANSING, MICHIGAN, ASSIGNOR TO GENERAL MOTORS CORPORATION, OF DETROIT, MICHIGAN, A CORPORATION OF DELAWARE

BROACHING MACHINE

Original application filed January 23, 1928, Serial No. 248,842. Divided and this application filed November 20, 1929. Serial No. 408,494.

This invention relates to the manufacture of bearings of the interchangeable type commonly used on automobile engines, and this application is concerned particularly with the broaching machine disclosed in my prior application, S. N. 248,842, filed January 23, 1928, now matured into Patent No. 1,761,926, of which this is a division.

The object of the present invention is to construct a broaching machine for accurately machining the parting line, or in other words, the meeting edges of bearing halves. The various operations in the process of making bearings prior and subsequent to the broaching of these edges, as is fully disclosed in my aforesaid application, form no part of the present invention and are not included herein. It is to be noted, however, that the parting line is used as the reference surface in all subsequent operations, requiring extreme accuracy in the machining thereof. It is desirable, furthermore, to chamfer the parting line at the same time it is machined, which is provided for in the improved broaching machine I have designed.

The machine is constructed with a mounting for the bearing half which permits it to center itself with respect to the broaching tool, which taken with other features, as will appear, insures the required accuracy. Furthermore, the machine has the desirable feature that it is readily adaptable for use in broaching and chamfering bearings of different wall thicknesses and diameters.

Other advantages will appear as the description proceeds, taken in connection with the accompanying drawings in which:

Figure 1 is a front elevation;

Figure 2 is a horizontal sectional view showing the clamping means for the bearing half;

Figure 3 is a side elevation partly in section.

Figure 4 is a top plan view, partly in section.

Figure 5 is a horizontal section through the vertical slide which carries the broaches, and Figure 6 is a detached top plan of one end of the clamp operating handle.

In the embodiment here illustrated, 42 represents the base of the machine. Between spaced guides 44 on the machine and beneath a cover plate 46 connecting the guides is mounted a slide 48 carrying at its forward end a holder 50 machined at 52 to accurately fit the outside of a formed half bearing. To the outer end of the slide 48 is secured a plate 54 equipped with adjustable stops 56 adapted to engage the outer ends of the guides 44 and limit the inward movement of the slide. On the base 42 is mounted a bracket 58 to which is pivoted lever 60 having a cam 61 at one end to engage the plate 54 and lock the slide 48 in its innermost position.

Within the slide 48 is slidably mounted clamping member 62 having its free end 64 up-turned and adapted to engage the inner surface of the bearing half. The shank of the member 62 is provided with teeth for engagement by pinion 66 carried by shaft 68 journalled in the cover plate 46. Above the member 62 there is slidably mounted in the block 48 a member 70 provided with rack teeth for engaging the teeth of the pinion 66. The member 70 projects through the plate 54 and is encircled by a coil spring 72 bearing at one end against the plate 54 and at the other end against nuts or other abutments 74 on the member. It will be apparent that upon rotation of the shaft 68 the clamp 62 is positively moved toward the holder 50 while the holder and the member 48 which carry it are yieldingly urged toward the clamp through the action of member 70 and spring 72.

Instead of fastening a handle directly to the shaft 68 to produce this operation I have preferred to interpose a one way clutch between the handle and the shaft. As shown in Figure 4, a disk 76 is keyed to the member 68. The disk is provided with notches 78 for receiving balls 80 forming in conjunction with the surrounding casing 82 carried by the cover plate 46, a common type of ball clutch. The operating handle 84 is provided with a hollow hub 86 slotted to provide spaced fingers 88 fitting between the balls 80. Upon clockwise rotation of the handle 84 the fingers 88 engage the balls 80 and through them rotate the collar 76 and shaft 68 causing the member 62 and slide 48 to be moved toward each other until the resistance to turning of the shaft 68 becomes great as the bearing half is clamped between the finger 64 and the seat 50 compressing spring 72 whereupon the balls 80 will be forced into wedging engagement between the notches 78 and the interior of the surrounding casing 82 locking the parts in clamping position. When the handle 84 is moved in counter-clockwise direction the fingers 88 knock the balls 80 out of wedging engagement with the casing 82 and through them cause counter-clockwise rotation of shaft 68 and return of the member 62 and the slide 48 to their original positions.

From the base 42 arise standards 90 provided with guides 92 between which slides a member 94 carrying broaches 96 and cutters 98 for trimming the parting line of the bearing. The slide 94 likewise carries fixed stop 100 and spring-pressed stop 102 positioned to engage the edges of the bearing 10, as shown in Figure 10. These stops are located below the broaches and function to properly center the bearing to receive the cut. The operation of this apparatus is as follows:

With the slide 94 and broaches 96 in the position illustrated the operator inserts a half bearing 10 between the members 50 and 64 and shoves handle 60 downwardly moving slide 48 forward until the edges of the bearing, that is, the parting line, engage the stops 100–102 and locking the slide in that position. As the bearing is not clamped at this time it is free to adjust itself in the seat 52. The next operation consists in swinging the lever 84 in clockwise direction causing the part 64 to engage the inner surface of the bearing 10 and clamp it in the seat. Further movement of the operating handle results in locking the parts in position. With the bearing clamped in place, the slide 94 is is now moved downwardly and the broaches trim the edges of the bearing. Following this, the cutter 98 engages the outer corners of the bearing and bevels them. This done, the slide 94 is returned to its original position, the handle 84 is moved in counter-clockwise direction releasing the member 64 from clamping engagement with the bearing, the lever 60 is swung upwardly and the bearing half is removed from the machine. By performing the operation in the manner described, it is apparent that the bearing 10 is afforded opportunity to properly seat itself prior to being clamped in position. This assures a more accurate cut and a more accurate final product for the reason that the outside diameter of the bearing is the one which determines the accuracy of fit in the crankcase and it is this same surface that is used as a reference surface in seating the bearing in the machine.

By making stops 56 adjustable, it is possible to adapt the machine for bearings of different wall thicknesses and by making the seats 50 removable it is possible to adapt the machine for bearings of different diameters. Obviously, the operating means for the clamping member 62–64 is such that it adapts itself to various sizes of bearing.

I call particular attention to the fact that the broaches 96 are provided with bevelled cutters. This is important for the reason that it makes it unnecessary to move the bearings away from the cutters on the return stroke. With the cutters horizontal, the metal shaved off the edges of the bearings would tend to wedge between the cutters and the edges of the bearing on the return stroke and mar or deform the latter. By employing bevelled cutters, the shavings fall by gravity out of the cutting zone so that this difficulty is avoided.

I claim:

1. In a broaching machine for half bearing or like sections, cooperating clamping elements engageable with a section, a member movable relative thereto carrying cutting tools, and means for centering the section between the clamping elements prior to final clamping of the same, including elements mounted on said movable member.

2. The combination set forth in claim 1, said centering elements comprising fixed and spring-pressed stops engageable respectively with opposite side edges of the section.

3. In a broaching machine for half bearing or like sections, cooperating clamping elements for clamping a section, a member movable relative thereto carrying means to trim the side edges of the section, and means carried by said movable member engageable with said side edges for adjusting the same relative to said trimming means prior to final clamping.

4. In a broaching machine for half bearing or like sections, cooperating clamping elements for clamping a section, centering members to adjust the section between the clamping elements, means for moving said clamping elements in unison to engage the section held thereby with said centering members, and means to thereafter move said clamping elements relative to each other to clamp the section firmly therebetween.

5. In a broaching machine for half bearing or like sections, cooperating clamping elements for clamping a section, a movable member carrying trimming tools and centering elements for the section, and means for moving both said clamping elements towards said centering elements to engage the section therewith.

6. The combination set forth in claim 5, with a means to move the clamping elements relative to each other, said means including a one way clutch operating positively in one direction to permit adjustment of the clamping pressure.

7. An apparatus for retaining a half bearing or like section in position for broaching the edges thereof, comprising a member provided with a holder to engage one side of the section, a clamping member to engage the other side movable relative to said holder, a cooperating member adjacent and movable relative to said clamping member, a spring interposed between said cooperating member and said holder, and a means for moving said clamping member and cooperating member in opposite directions to clamp the section between said clamping member and holder.

8. The combination set forth in claim 7, said means including a one way clutch to facilitate the clamping and releasing operations operating positively in one direction to permit adjustment of the clamping pressure.

9. In a broaching machine for half bearing or like sections, a base, a vertically sliding member thereon, carrying cutting tools, a horizontal slide on said base carrying clamping means for a section, said clamping means including a holder and a clamping member engageable, respectively, with the outer and inner surfaces of a section, said slide being provided with an operating handle to move the same toward the sliding member, adjustable stops to limit the extent of movement, means on said sliding member engaging the section to center the same relative to said holder during such movement of the slide, said clamping member being movably mounted on said slide, and means for moving the said clamping member into firm clamping engagement with the section.

10. In a broaching machine for half bearing or like sections, a base, a slide mounted in longitudinal guides on said base, said slide provided with a holder to engage the outer surface of a section, a clamping member to engage the inner surface of the section, said clamping member mounted in said slide for adjustment relative to said holder, vertically reciprocable cutting elements carried by said base, a means to move said slide and clamping member longitudinally so that the section extends into the plane of movement of said cutting elements, means to engage the edges of the section during said movement to center the same, and additional means to thereafter adjust said clamping member relative to said slide to hold said section in final clamped and centered position.

In testimony whereof I affix my signature.

CHAS. LANDERS.